US010401205B2

United States Patent
Poque et al.

(10) Patent No.: US 10,401,205 B2
(45) Date of Patent: Sep. 3, 2019

(54) VALVE INCORPORATING A FLOWMETER FOR MEASURING A FLOW OF FLUID INSIDE SAME

(71) Applicant: YZATEC, Blagnac (FR)

(72) Inventors: Mathieu Poque, Villefranche-de-Lauragais (FR); Alain Ramond, Toulouse (FR)

(73) Assignee: YZATEC, Blagnac (FR)

( * ) Notice: Subject to any disclaimer, the term of this patent is extended or adjusted under 35 U.S.C. 154(b) by 124 days.

(21) Appl. No.: 15/567,135

(22) PCT Filed: Apr. 20, 2016

(86) PCT No.: PCT/FR2016/050923
§ 371 (c)(1),
(2) Date: Dec. 18, 2017

(87) PCT Pub. No.: WO2016/170270
PCT Pub. Date: Oct. 27, 2016

(65) Prior Publication Data
US 2018/0136025 A1 May 17, 2018

(30) Foreign Application Priority Data

Apr. 23, 2015 (FR) ...................................... 15 53673

(51) Int. Cl.
*G01F 1/66* (2006.01)
*E03B 9/02* (2006.01)
(Continued)

(52) U.S. Cl.
CPC ................ *G01F 1/667* (2013.01); *E03B 9/02* (2013.01); *F16K 37/005* (2013.01); *G01F 1/662* (2013.01);
(Continued)

(58) Field of Classification Search
CPC .......... G01F 1/667; G01F 1/662; G01F 15/18; G01F 15/005; G01F 15/068; E03B 9/02; F16K 37/005; Y10T 137/5327
(Continued)

(56) References Cited

U.S. PATENT DOCUMENTS 4,452,077 A * 6/1984 Siegfried, II ............. G01F 1/66
73/152.32
4,785,713 A * 11/1988 Cloup ..................... F01L 23/00
137/624.14
(Continued)

FOREIGN PATENT DOCUMENTS

CN 203 412 037 U 1/2014
DE 20 2008 003584 U1 7/2009
(Continued)

OTHER PUBLICATIONS

International Search Report, dated Jul. 7, 2016, from corresponding PCT/FR2016/050923 application.

*Primary Examiner* — Eric Keasel
*Assistant Examiner* — Kevin R Barss
(74) *Attorney, Agent, or Firm* — Ipsilon USA, LLP

(57) ABSTRACT

Disclosed is a valve including: a body; a closure member; and a closure member control rod, the control rod extending inside the body at least partially within a fluid flow area. The control rod includes, in the fluid flow area, at least one flowmeter including: a tubular body having two axial ends; a flow measuring device supported by the tubular body and associated with the tubular body so as to enable a flow of fluid flowing outside the tubular body to be measured, and the electrical connection; and an electrical connection extending outside of the tubular body and passing through the tubular body by at least one fluid-tight passage.

20 Claims, 5 Drawing Sheets

Figure 1:
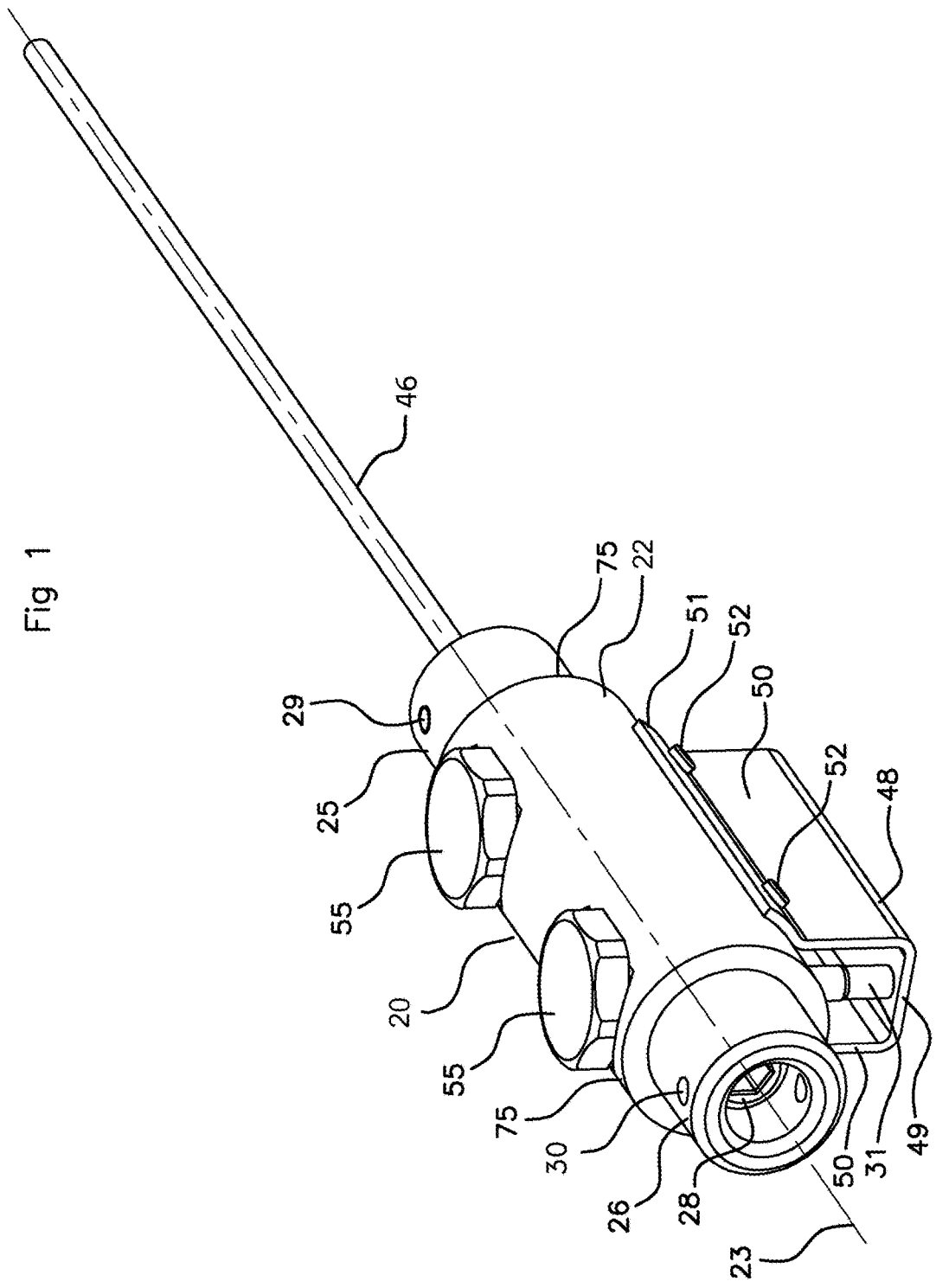

(51) Int. Cl.
*F16K 37/00* (2006.01)
*G01F 15/18* (2006.01)
*G01F 15/00* (2006.01)
*G01F 15/06* (2006.01)

(52) U.S. Cl.
CPC .......... *G01F 15/005* (2013.01); *G01F 15/068* (2013.01); *G01F 15/18* (2013.01)

(58) Field of Classification Search
USPC ........................................................ 73/290 R
See application file for complete search history.

(56) References Cited

U.S. PATENT DOCUMENTS

| | | | | |
|---|---|---|---|---|
| 5,168,200 | A * | 12/1992 | Payne | G01F 1/26 251/129.11 |
| 5,652,396 | A * | 7/1997 | Gill | G01F 1/662 73/861.27 |
| 5,691,485 | A * | 11/1997 | Endo | G01F 1/8409 73/861.357 |
| 6,629,564 | B1 * | 10/2003 | Ramakrishnan | E21B 34/06 166/250.01 |

FOREIGN PATENT DOCUMENTS

| | | |
|---|---|---|
| EP | 0 481 141 A1 | 4/1992 |
| JP | H08 14974 A | 1/1996 |
| JP | H11 201790 A | 7/1999 |

* cited by examiner

VALVE INCORPORATING A FLOWMETER FOR MEASURING A FLOW OF FLUID INSIDE SAME

The invention relates to a flowmeter more particularly adapted to be incorporated in a valve or a fire hydrant. The invention also relates to such a valve.

A flowmeter is a device allowing the flow rate of a fluid, i.e. a liquid or gas, or even a gas-liquid mixture, to be measured. In particular, flowmeters having flow measuring devices which require an electrical connection are known. These are in particular flowmeters having transducers, in particular ultrasonic transducers, allowing the flow rate of a fluid to be measured using the propagation time of ultrasonic waves in the fluid. However, these flowmeters require an electrical connection to be established between the flowmeter and the environment external to the flow of fluid with which the flowmeter is in contact, which may pose particular problems in certain configurations and/or applications. There is also the problem of incorporating a flowmeter actually within a valve, such as a fire hydrant.

Furthermore, the performance of the flowmeters with ultrasonic transducers may be impaired when the flowmeters are placed in an extreme environment such as the inside of a valve or piping in which a fluid flows turbulently. The forces caused by the flow of the fluid thus acting on the transducers can deform and/or weaken the transducers, and thus falsify the measurements thereof and/or reduce the service life thereof. However, maintenance and/or replacement operations for such devices are often particularly complex and costly, in particular when the device is installed in a duct which is difficult to access, e.g. underground or submerged, and require the interruption of the flow and of the corresponding installation.

A valve is a device which allows the flow of a fluid to be regulated. A valve thus allows the flow of a fluid to be stopped and modified. For example, a fire hydrant is a valve mainly used to provide water, in an emergency, to firemen so as to fight a fire.

Measuring the flow rate of the flow of water from a fire hydrant proves to be useful in ensuring correct operation of this fire hydrant. It may also be useful to continuously monitor the flow rate of the flow of water in the fire hydrant to send an alarm signal if abnormal usage is detected. Abnormal usage of a fire hydrant may be detected if water is stolen or after a fire hydrant has been damaged and water is leaking therefrom.

Numerous types of flowmeter allowing a rate of a flow of water from a fire hydrant to be measured are already known. Some of these flowmeters are placed at the outlet (water supply connection) of the fire hydrant. These known flowmeters are used for monitoring purposes from time-to-time in order to verify the effective operation of the fire hydrant. This arrangement has several disadvantages. In fact, for each monitoring event, the flowmeter must be mounted and then removed, thereby causing a considerable loss of time. In addition, if such a flowmeter remains mounted on the exterior of a fire hydrant, it thus risks becoming damaged (accident, vandalism).

CN203412037 describes a buried automatic alarm device for a fire hydrant comprising a flowmeter arranged on the underground piping connected to the fire hydrant, a monitoring unit and a communication system. It is not easy to maintain the flowmeter of such a device because the ground must be dug up in order to access the flowmeter.

DE 20 2008 003584 describes a device for measuring the flow of a fluid, comprising a rod comprising piezoelectric transducers, said rod being adapted to receive a fluid in order to measure its flow. The rod can be used as a control rod of a closure member of a valve. Such a flow measuring device has a complex structure which depends upon the valve with which the flow measuring device is associated.

The invention thus aims to overcome all of these disadvantages.

The invention thus generally aims to propose a flowmeter which can be installed simply and can be incorporated in a valve such as a fire hydrant, or piping such as a water duct.

The invention aims in particular to propose such a flowmeter which can be installed simply, and in particular within a valve such as a fire hydrant, or piping such as a water duct, whilst being able to be easily replaced or repaired.

The invention aims more particularly to propose such a device which is sturdy and compatible with a harsh external environment, in particular one which can be buried or submerged.

The invention aims in particular to propose such a flowmeter which outputs measurement signals which are reliable and precise regardless of the nature of the flow of the fluid and possible variations thereof (which may possibly be sudden and large), and whose service life is improved.

The invention aims more particularly to propose such a device which is completely autonomous in operation, pre-set during production, and whose settings and/or features are not liable to vary during operation, including owing to its use in highly unstable environments (high-speed and/or turbulent flows . . . ).

The invention also aims to propose such a device which is simple, inexpensive to produce and has a small number of parts.

The invention aims more particularly to propose such a flowmeter comprising a device for measuring the flow rate of a fluid comprising at least one ultrasonic transducer.

The invention also aims to propose a valve—in particular but not exclusively a fire hydrant—incorporating at least one flowmeter. The invention aims more particularly to propose such a valve incorporating at least one flowmeter having the advantages mentioned above.

To this end, the invention relates to a flowmeter comprising:
  a tubular body having two axial ends,
  a flow measuring device supported by the tubular body,
  an electrical connection extending outside the tubular body, characterised in that:
  the flow measuring device is associated with the tubular body so as to enable a flow of fluid flowing outside the tubular body to be measured,
  said electrical connection passes through the tubular body by at least one fluid-tight passage.

In particular, advantageously and in accordance with the invention, the tubular body is fluid-tight and includes at least one electronic circuit of the flow measuring device. Therefore, the sealing-tightness of the tubular body allows it to be fully submerged in the fluid.

Furthermore, advantageously and in accordance with the invention, at least one—in particular only one—of the axial ends of said tubular body comprises a fluid-tight passage for the electrical connection. This sealed passage allows signals emitted by a transducer of the flowmeter to be transmitted to the outside without the electrical connection being in contact with the fluid, in particular a wet medium.

Furthermore, advantageously and in accordance with the invention, said flow measuring device comprises at least one ultrasonic transducer—in particular at least two ultrasonic transducers facing each other—comprising a proximal end mounted on said tubular body and extending outside said tubular body to a distal end of said transducer. Therefore, the flow rates of a fluid outside of the tubular body can be measured in a simple, reliable and precise manner via ultrasound.

An ultrasonic transducer comprises a rigid shell enclosing different components ensuring operation of the transducer. The distal end of the transducer is thus the distal end of the rigid shell of the transducer. Similarly, the proximal end of the transducer is the proximal end of the rigid shell of the transducer.

Advantageously and in accordance with the invention, the measuring device is arranged to allow a flow of fluid flowing along the tubular body to be measured.

In certain embodiments and in accordance with the invention, said tubular body is a straight tubular body extending along an axis passing through the two axial ends. In these embodiments, advantageously and in accordance with the invention, each ultrasonic transducer extends overall orthogonally to the axis of said tubular body. It is mounted on the tubular body by attachment in an orifice of the wall of the tubular body extending orthogonally to the axis of the tubular body, i.e. radially.

Furthermore, preferably, the flowmeter comprises a U-clamp for mounting the distal end of each transducer (i.e. the rigid shell thereof) on said tubular body. The inventors have noted that simply by mounting the distal end of a transducer on the body by a mounting U-clamp, the sturdiness of the flow measuring device is improved. Furthermore, a hyperstatic-type assembly can be obtained when the transducer is further embedded in the body by way of its proximal end. Such a hyperstatic-type assembly allows in particular, on the one hand, a considerable reduction in errors in the measuring signal and, on the other hand, an improvement in the mechanical connection between the transducer and the body and, in so doing, an increase in the service life of the device. In particular, such a hyperstatic assembly allows a limitation of the vibrations of each transducer under the effect of transient phenomena such as the establishment or interruption of the flow of the fluid or possible turbulence in the flow of the fluid. Furthermore, the device can be set precisely during production, and these settings are not disrupted during operation.

The assembly between the distal end of a transducer and the body has the function of preventing relative movements of this distal end with respect to the body (and thus with respect to its proximal end) in at least one direction orthogonal to the longitudinal direction of the transducer, i.e. of preventing bending deformations of the transducer corresponding to a movement of the distal end at least in said orthogonal direction. A flowmeter in accordance with the invention is intended to be placed in contact with a flow of fluid flowing in a flowing direction relative to the body. Advantageously and in accordance with the invention, the transducer is arranged relative to the body such that its longitudinal direction is secant with the flow of fluid, and thus with the flowing direction of the fluid with respect to the body. Advantageously and in accordance with the invention, this assembly between the distal end and the body is adapted to rigidly fix the distal end relative to the body at least in any direction in parallel with the flowing direction of the fluid relative to the body. Preferably, the assembly between the distal end and the body is adapted to rigidly fix the distal end relative to the body in any direction orthogonal to the longitudinal direction, i.e. to prevent any bending deformation of the transducer corresponding to a movement of the distal end relative to the proximal end.

Advantageously and in accordance with the invention, each of the two axial ends of the tubular body is arranged to be able to be coupled to a rod for conjoint rotation therewith. Furthermore, advantageously and in accordance with the invention, the tubular body can be adapted to be able to transmit forces—in particular rotational and/or longitudinal translational forces—between its two axial ends. Therefore, a flowmeter in accordance with the invention has two functions: not only is it acting as a flowmeter allowing the flow of the fluid to be measured, but it also constitutes a member for transmitting forces—in particular rotational and/or longitudinal translational forces—between a driven member and a driving member, e.g. a valve actuator and a valve closure member.

The invention also relates to a valve comprising:
a body,
a closure member,
a closure member control rod, said control rod extending inside the body at least partially within a fluid flow area and comprising at least one flowmeter in said flow area,
characterised in that said at least one flowmeter comprises:
a tubular body having two axial ends,
a flow measuring device supported by the tubular body and associated with the tubular body so as to enable a flow of fluid flowing outside the tubular body to be measured,
an electrical connection extending outside of the tubular body and passing through the tubular body by at least one fluid-tight passage.

The invention relates in particular to such a valve, characterised in that the control rod comprises at least one flowmeter in accordance with the invention.

Advantageously, a valve in accordance with the invention is also characterised in that the closure member is a rotary closure member, and in that the flowmeter is adapted to be able to transmit rotational movements between an actuator of the valve and the closure member.

To this end, advantageously and in accordance with the invention, a first axial end of the flowmeter—in particular of the tubular body—is mounted on a driving member, and a second axial end of the flowmeter is mounted on a driven member for driving the closure member.

In certain advantageous embodiments in accordance with the invention, a first axial end of the flowmeter—in particular of the tubular body—is mounted on an end of a first control rod, named driving control rod, coupled to an actuator of the valve, and a second axial end of the flowmeter—in particular of the tubular body—is mounted on an end of a second control rod, named driven control rod, coupled to the closure member. The connections between the actuator, the control rods, the flowmeter and the closure member form a mechanical transmission allowing the positional movements of the closure member to be controlled under the effect of the movement of the actuator, and thus allowing the flow of the fluid in the valve to be controlled by the closure member by virtue of a simple rotation of the actuator. In addition, such a flowmeter can be mounted on any valve incorporating at least one tubular rod arranged in the valve in order to be able to be in contact with a fluid.

Furthermore, advantageously a valve in accordance with the invention is also characterised in that at least the driving control rod is a tubular rod, and in that said electrical connection of the flowmeter extends into the tubular driving control rod. Therefore, the electrical connection of the flowmeter to the exterior of the valve can be made in a simple, reliable and safe manner without the risk of deterioration or short-circuit.

In particular, a valve in accordance with the invention is a fire hydrant. Advantageously and in accordance with the invention, the rod and the flowmeter are arranged in the body of the fire hydrant so as to facilitate mounting thereof as well as maintenance of the flowmeter. In fact, the flowmeter is placed in the heart of an above-ground (non-buried) part of the fire hydrant. This part of the fire hydrant can be removed from the rest of the body of the fire hydrant, thereby permitting simple access to the tubular control rod incorporating the flowmeter as well as access to the flowmeter if maintenance is required. Such an arrangement thus does not require in particular the ground to be dug up in order to access the flowmeter. Furthermore, the flowmeter incorporated within the actual body of the fire hydrant is protected against external attacks and is safe. A valve in accordance with the invention can also be used in applications other than a fire hydrant.

Figure 2:
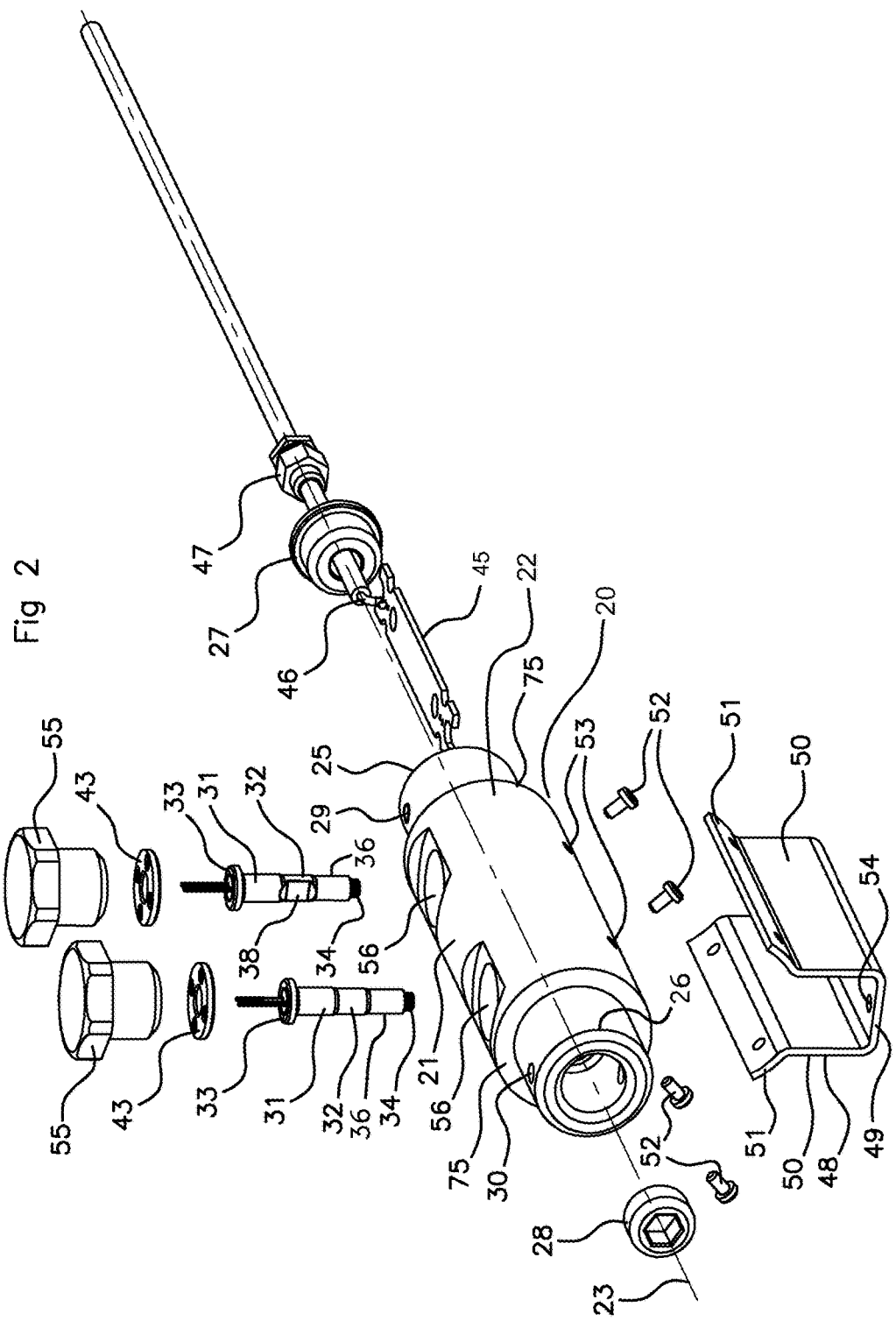
Figure 3:
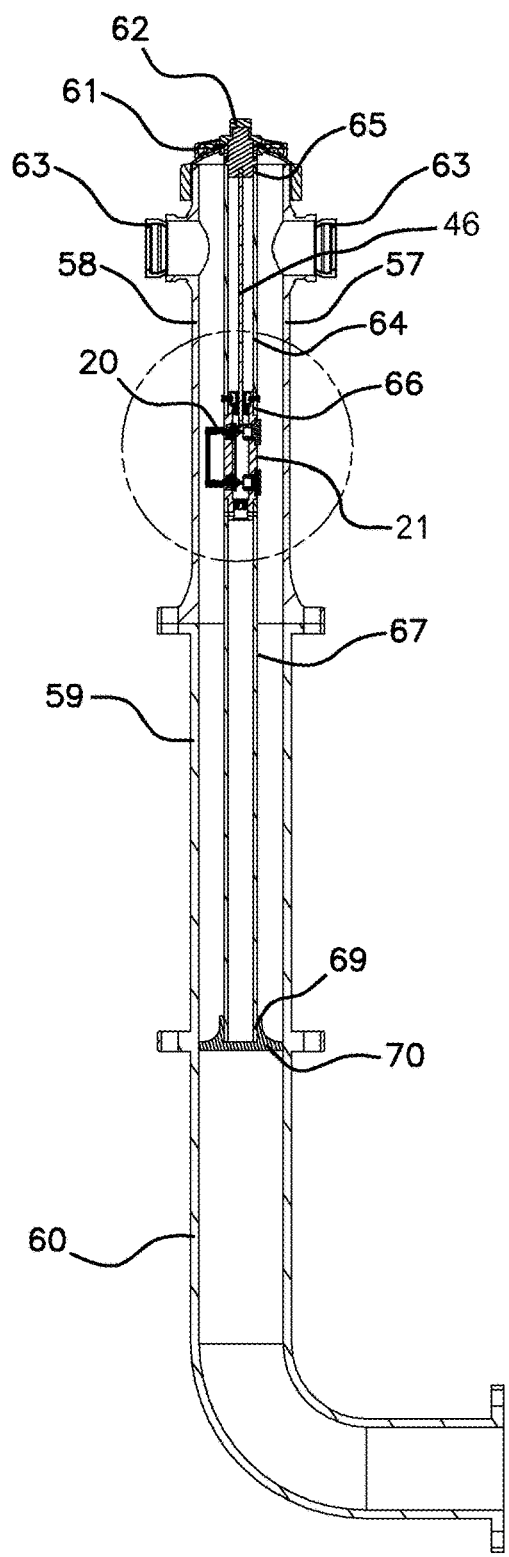
Figure 4:
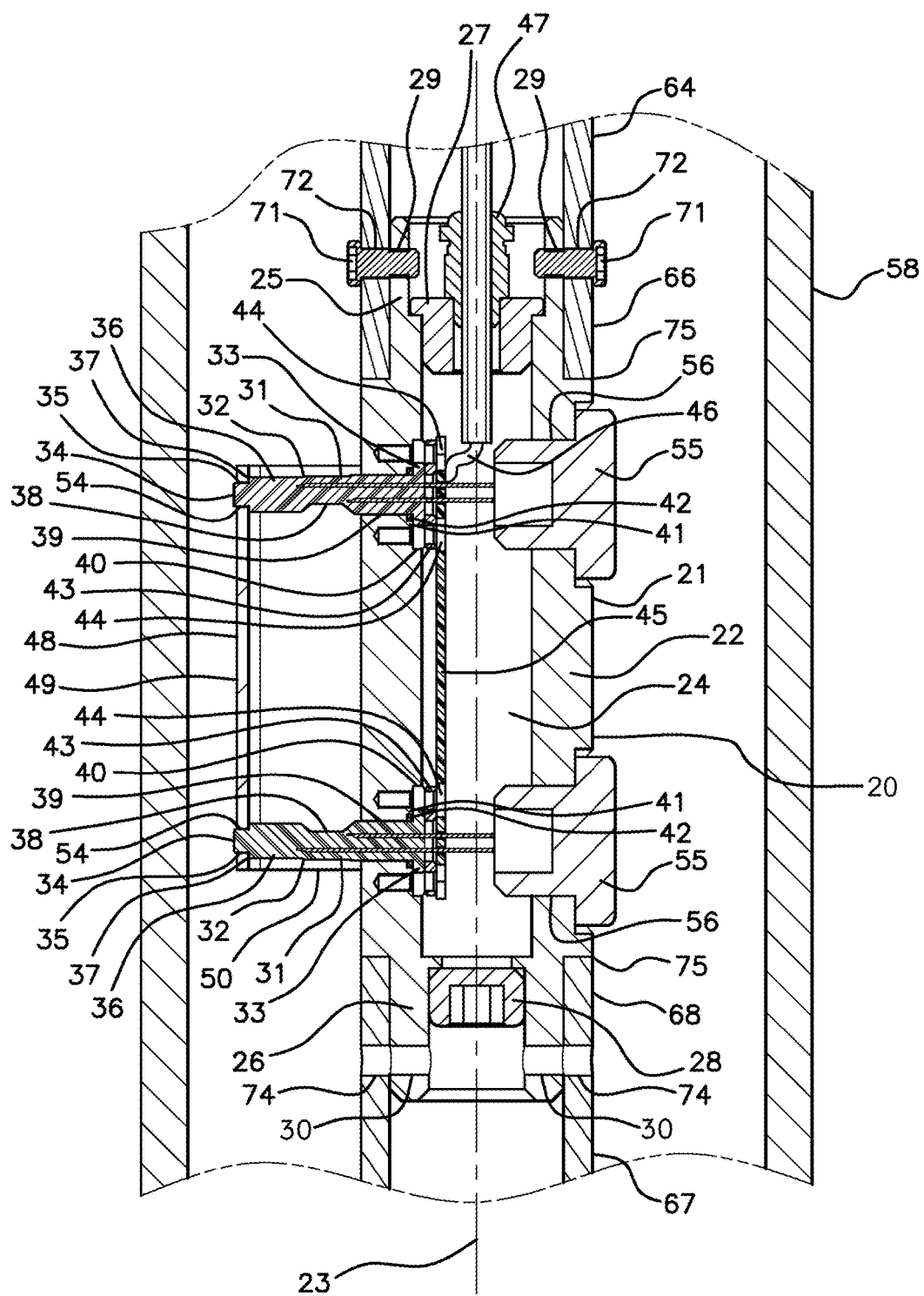
Figure 5:
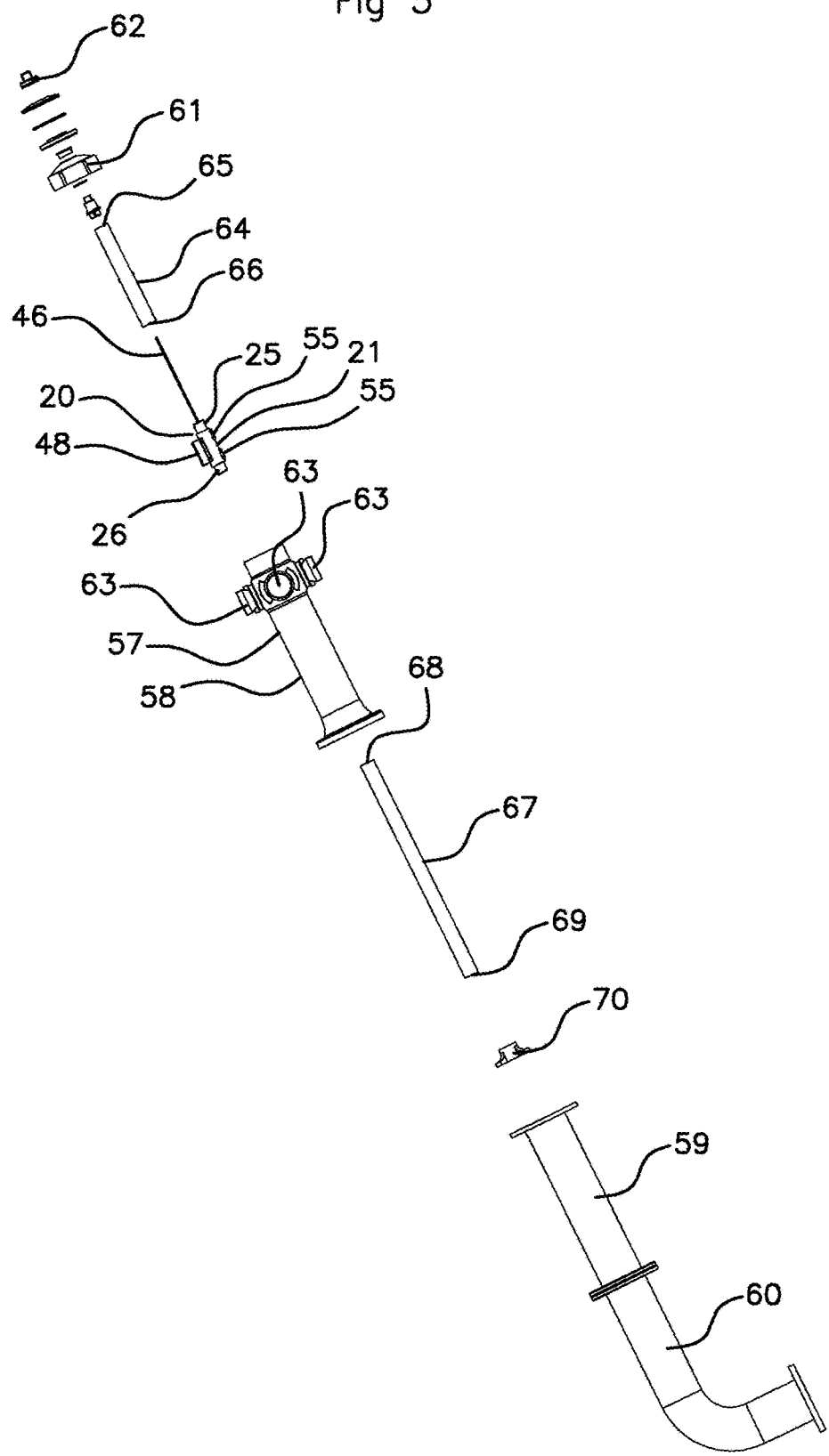

Other aims, features and advantages of the invention will become apparent upon reading the following description given by way of non-limiting example and which makes reference to the attached figures in which:

FIG. 1 is a schematic perspective view of a flowmeter in accordance with one embodiment of the invention, FIG. 2 is a schematic, perspective and exploded view of the flowmeter in FIG. 1, FIG. 3 is a schematic axial cross-sectional view of a fire hydrant in accordance with one embodiment of the invention incorporating a flowmeter in accordance with the invention, FIG. 4 is a schematic, detailed view of FIG. 3 illustrating more particularly the flowmeter in accordance with the invention, FIG. 5 is a schematic, perspective and exploded view of the fire hydrant in FIG. 3.

A flowmeter 20 in accordance with the invention is shown, in one particular embodiment of the invention, in FIGS. 3 to 5 mounted on two rods within a body of a fire hydrant. This flowmeter 20 comprises a generally tubular straight body 21 extending axially in a main direction 23. This body 21 is formed by a tubular wall 22 delimiting a sealed housing 24, and the two axial ends 25, 26 of the body are sealingly plugged by plugs 27, 28. The tubular body 21 can be formed of any material which is sealed with respect to the fluid whose flow rate is to be measured, i.e. in particular water-tight material in the case of a fire hydrant. It can be in particular a stainless metal alloy, or a rigid polymeric synthetic material.

Each axial end 25, 26 of the body 21 is arranged to be able to be embedded in a tubular rod, of which one end comes to abut axially against an outer shoulder 75 of the tubular wall 22. A first axial end 25 has threaded holes 29 and the other axial end 26 has orifices 30 passing through the thickness of the tubular wall 22.

This flowmeter likewise comprises two ultrasonic transducers 31 shown only schematically in the figures. Such an ultrasonic transducer is known per se and can be the subject of numerous embodiment variations. Each transducer 31 comprises a rigid shell enclosing and surrounding the different components of the transducer and having a main, rigid portion 32 extending in a longitudinal direction of the transducer, a proximal end 33 and a distal end 34. The proximal end 33 is wider than the main portion 32 and forms the widest part of the transducer 31. The distal end 34 is thinner than the main portion 32 and forms the thinnest part of the transducer 31. Since the distal end 34 is thinner than the main portion 32 of the transducer, a distal shoulder 37 connects the peripheral lateral face 35 of the distal end 34 to the peripheral lateral face 36 of the main portion 32 of the transducer.

The proximal end 33 of each transducer 31 is placed towards the interior of the tubular body 21 whilst the main portion 32 passes through the wall 22 of the body 38 and extends protruding outwards relative to said tubular body 21 such that the active area 38 of the transducer 31 and the distal end 34 of the transducer 31 are on the outside of the tubular body 21. The two active areas 38 of the two transducers 31 face each other, aligned in a direction in parallel with the main direction 23 of the tubular body 21 such that the ultrasonic waves emitted by the active area 38 of one of the transducers 31 are received by the active area 38 of the other transducer 31.

The tubular body 21 comprises two diametrically opposite orifices 39 passing through the thickness of the tubular wall 22 and in which the proximal ends 33 of the transducers are embedded. Each orifice 39 comprises an inner recess 40 issuing within the tubular wall 22 and adapted to receive the proximal end 33 of a transducer, and an outer, thinner recess 41 adapted to house a seal 42 in contact with a shoulder of the proximal end 33. The proximal end 33 is held in the inner recess 40 by a washer 43 mounted within the tubular wall 22 of the body 21 by screws 44 allowing the seal 42 to be compressed and the transducer 31 to be fixed in longitudinal translation relative to the body 21.

The device in accordance with the invention also comprises a printed circuit board 45 in the sealed housing 24 provided within the body 21. This printed circuit board 45 is adapted to form signals for controlling one of the transducers 31 (ultrasonic wave emitter) and process the measurement signals issued by the other transducer 31 (receiving the ultrasonic waves). The printed circuit board 45 is connected to the exterior of the sealed housing 24 by connecting wires 46, forming an electrical connection 46, passing through a fluid-tight passage, of the cable gland-type 47, of one 27 of the axial end plugs of the tubular body 21 of the flowmeter. The printed circuit board 45 is generally rectangular in shape and is placed onto the two washers 43. The printed circuit board 45 is attached to the tubular wall 22 with the washers 43 by the screws 44.

The electrical connection 46 of the flowmeter can be used to supply power to the measuring device and as a wire for transmitting electrical signals to the printed circuit board 45 and/or to an electronic device placed on the outside of the flowmeter 20.

The flowmeter in accordance with the invention further comprises a U-clamp 48 extending along and on the outside of the body 21 between the two transducers 31 which it connects, and having a core 49 and two flanges 50 whose ends 51 are attached to the body 21 and are flared so as to be adjusted to the cylindrical shape of the outer face of the tubular wall 22 of the body 21.

In the illustrated example, the U-clamp 48 is mounted on the body 21 such that the flanges 50 of the U-clamp 48 are at least substantially in parallel with the longitudinal direction of the transducers 31. The flanges 50 are also in parallel with the main direction of the tubular body 21 and are bent away from the transducers 31. The core 49 of the U-clamp 48 is flat and orthogonal to the flanges 50 and to the longitudinal direction of the transducers 31 and is in parallel with the main direction of the tubular body 21. There is nothing to prevent the provision of other shapes for the U-clamp 48, e.g. with flanges 50 inclined relative to this longitudinal direction and/or a core 49 with a curved, transverse cross-section, or the like.

The flared ends 51 of the flanges 50 are attached to the tubular wall 22 of the body 21 by screws 52 tightened into conjugated internal threads 53 of the tubular wall 22. The core 49 of the U-clamp 48 comprises two bores 54 passing through the thickness of the core 50, the distal ends 34 of the transducers 31 being inserted and embedded in said bores without any radial clearance. In the variant shown, the distal shoulder 37 of the main portion 32 is in contact with the core 49 of the U-clamp 48, each transducer 31 being prevented from moving in translation between the body 21 and the U-clamp 48.

In this embodiment, a fluid can flow outside the tubular body 21 in a flowing direction which may be in parallel with the main direction 23 of the tubular body 21. The fluid can thus likewise flow into the space between said body 21 and the U-clamp 48 where the two transducers 31 are placed.

The tubular body 21 comprises two bores 56 passing through its wall 22, said bores being diametrically opposite the two orifices 39 for receiving the transducers 31, for the insertion of the transducers 31 within the housing 24. Two sealed plugs 55 are then placed into these bores 56.

A flowmeter in accordance with this embodiment of the invention can be produced by forming the body 21 with the bores 56, the orifices 39 and the recesses 40, 41. Two transducers 31 and a U-clamp 48 with conjugate dimensions are selected. A seal 42 is placed in each outer recess 41 and then a transducer 31 is inserted through each bore 56 into the diametrically opposite orifice 39 until the proximal end 33 of the transducer 31 is embedded in the inner recess 40. Then, a washer 43 is placed over each transducer 31 and thereafter a printed circuit board 45 is placed over each washer 43 by passing it through one 25 of the axial ends of the body 21. Then, the assembly formed by the printed circuit board 45 and the washer 43 is attached via the screws 44 to the tubular wall 22 using a tool passed through the bores 56. Then, the plugs 27, 28 are mounted in the ends of the body 21 and the sealed plugs 55 in the bores 56.

A flowmeter in accordance with the invention can be integrated in any valve comprising a tubular rod for controlling a closure member placed in the valve, this tubular control rod being in contact with a flow of fluid.

The integration of such a flowmeter 20 in a fire hydrant 57 is shown in FIGS. 3 to 5. The fire hydrant 57 comprises a body having three distinct sections: an upper, above-ground section 58, an intermediate section 59 which is underground but has an upper end showing on the surface of the ground, and a section 60 for underground connection to piping for supplying the fire hydrant with pressurised water. The upper section 58 of the fire hydrant extends vertically in a direction defining a direction of flow in this upper section 58. The upper end of the upper section 58 is surmounted by a hood 61 having an actuator 62. The actuator 62 is a movement member allowing the opening or closing of a closure member 70 placed between the intermediate section 59 and the connecting section 60. This closure member 70 allows the circulation of water into the intermediate section 59 and upper section 58 to be interrupted when the closure member is closed by moving the actuator 62. In contrast, the closure member 70 allows the circulation of water into the intermediate section 59 and upper section 58 to be started when the closure member is opened by moving the actuator 62. The actuator 62 is generally moved in rotation using a tool such as a key conjugate to this actuator 62.

The upper section 58 likewise comprises several lateral water supply connections 63 through which the pressurised water can discharged from the fire hydrant, and which allow the connection of fire-fighting equipment hoses. The lower end of the upper section 58 is mounted on an upper end of the intermediate section 59. The lower end of the intermediate section 59 is mounted on an upper end of the connecting section 60. The lower end of the connecting section 60 is mounted on piping allowing the fire hydrant 57 to be supplied with pressurised water.

The upper section 58 incorporates a driving control rod 64 extending within the section 58 in the direction of water flow, vertically along the axis of the upper section 58. The upper end 65 of the driving control rod 64 is coupled to the actuator 62 so as to be able to transmit the rotational movement exerted on the actuator 62 to the driving control rod 64. The lower end 66 of the driving control rod 64 is coupled to the axial end 25 of the flowmeter 20 having the plug 27 incorporating the sealed passage 47 for the electrical connection 46.

The flowmeter 20 is placed within the upper section 58 of the fire hydrant 57 such that the tubular body 21 extends in the direction of fluid flow. This arrangement thus allows easy access to the flowmeter for maintenance thereof because the actuator 62 and the driving control rod 64 can be easily removed from the rest of the fire hydrant.

The other axial end 26 of the flowmeter is coupled to the upper end 68 of a driven control rod 67. Another lower end 69 of the driven control rod 67 is coupled to the closure member 70. Therefore, the rotational movement exerted on the actuator 62 by an operator is transmitted to the closure member 70 via the driving control rod 64, the tubular body 21 of the flowmeter, and the driven control rod 67, which allows the closure member 70 to be rotationally driven with respect to the body of the fire hydrant in order to control the flow of water in the upper section 58 and in the intermediate section 59.

In the illustrated embodiment, the axial end 25 of the flowmeter is assembled with the lower end 66 of the driving control rod 64 via screws 71 each passing through a bore 72 of the end of the driving control rod 64 and screwed into a threaded hole 29 of the axial end 25 of the flowmeter 20. The axial end 26 of the flowmeter is assembled with the upper end 68 of the driven control rod 67 by a pin (not shown in the figures) introduced radially into orifices 74 radially passing through the upper end 68 of the lower rod 67 and the orifices 30 facing the axial end 26 of the flowmeter. These two assemblies allow the tubular rods 64, 67 to be kept in contact with the shoulders 75 of the flowmeter. A seal (not shown) can be interposed between the shoulders 75 and the ends of the control rods to provide sealing tightness. Similarly, a seal (not shown) can be provided at the coupling screws 71 and/or the pin coupling the tubular control rods to the tubular body 21 of the flowmeter.

The electrical connection 46 of the flowmeter extends into the upper driving control rod 64 to the hood 61, this latter being able to be provided with a connector for joining to external electrical equipment (not shown) or an electronic circuit for remote transmission of data, e.g. by radio frequency with a remote monitoring unit. Therefore, the electrical connection is not in contact with the fluid.

The invention can be varied in many ways with respect to the embodiment described above and illustrated in the figures. In particular, the body of the flowmeter supporting the transducers may not be generally tubular. The axial ends of the flowmeter and the control rods may not be tubular so long as they have conjugate mounting means allowing them to be coupled in rotation and/or in translation for controlling the movements of the closure member under the effect of the movement of the actuator of the valve. There may also be several flowmeters inserted along the control rod of the closure member of the valve.

In certain embodiment variants, the U-clamp and the tubular body of the flowmeter can be formed of a single part. Such a flowmeter can be produced by moulding, for example.

The axial end 26 of the flowmeter can also be held with the end 68 of the driven control rod 67 not by a pin but by screws introduced into two diametrically opposed bores of the driven control rod 67 and screwed into two threaded holes of the axial end 26 of the flowmeter. As a variant or in combination, there is nothing to prevent the ends of the flowmeter being mounted on one and/or the other of the two control rods by any coupling means, e.g. by adhesion or by welding.

In certain embodiment variants, not shown, the measuring device comprises a single ultrasonic transducer whose active area is oriented to emit ultrasounds in parallel with the direction of fluid flow and towards a device for reflecting ultrasonic waves arranged to reflect the ultrasounds towards the ultrasonic transducer.

In accordance with other variants, not shown, a measuring device of a flowmeter in accordance with the invention can also comprise two ultrasonic transducers having an active area oriented to emit ultrasounds along an inclined axis with respect to the direction of fluid flow at an angle between 0° and 90° exclusive. In particular, the active area of the transducers is oriented to emit ultrasounds towards a reflecting device placed on the U-clamp of the flowmeter. This reflecting device is arranged to receive an ultrasonic wave emanating from one of the ultrasonic transducers and to redirect it, after reflection, to the other ultrasonic transducer. Furthermore, in such variants, the distal end of each ultrasonic transducer may not be mounted on the U-clamp such that it is positioned between the tubular body and the U-clamp of the flowmeter.

Furthermore, in some embodiment variants, the measuring device can comprise transducers other than ultrasonic transducers.

In accordance with another possible embodiment, not shown, of a valve in accordance with the invention, the tubular body of the flowmeter itself represents a control rod having a length equal to the original control rod of the fire hydrant. In other words, the control rod of the fire hydrant can itself be modified to be used as the tubular body of the flowmeter in accordance with the invention. In this embodiment, the U-clamp is mounted on the control rod. The bores, used to introduce the transducers and mounted over sealed plugs, as well as the recesses are thus machined in the control rod.

In accordance with another possible embodiment, not shown, of a valve in accordance with the invention, an axial end of the flowmeter placed within the valve is directly coupled to the actuator of the valve. The other axial end of the flowmeter is thus mounted on a driven control rod coupled to the closure member of the valve. The flowmeter must thus be arranged such that the active area of the transducers can be in contact with the fluid flow to one and/or the other of the water supply connections.

In accordance with another possible embodiment, not shown, of a valve in accordance with the invention, an axial end of the flowmeter placed within the valve is coupled to a driving control rod coupled to the actuator of the valve, whilst the other axial end of the flowmeter is coupled directly to the closure member of the valve. Again, the flowmeter must thus be arranged such that the active area of the transducers can be in contact with the fluid flow.

The invention can also be used in applications other than a fire hydrant and in which the same problems arise.

The invention claimed is:

1. Valve comprising:
   a body,
   a closure member,
   a closure member control rod, said control rod extending inside the body at least partially within a fluid flow area and comprising at least one flowmeter in said flow area,
   wherein said control rod comprises a first driving control rod, coupled to an actuator of the valve, and a second driven control rod, coupled to the closure member, and wherein said at least one flowmeter comprises:
   a tubular body having two axial ends, a first axial end of the flowmeter being mounted on one end of the driving control rod and a second axial end of the flowmeter being mounted on a second end of the driven control rod,
   a flow measuring device supported by the tubular body and associated with the tubular body so as to enable a flow of fluid flowing outside the tubular body to be measured,
   an electrical connection extending outside of the tubular body and passing through the tubular body by at least one fluid-tight passage.

2. Valve according to claim 1, wherein the tubular body of the flowmeter is fluid-tight and includes at least one electronic circuit of the flow measuring device.

3. Valve according to claim 2, wherein at least one of the axial ends of said tubular body of the flowmeter comprises a fluid-tight passage.

4. Valve according to claim 2, wherein said flow measuring device of the flowmeter comprises at least one ultrasonic transducer extending outside said tubular body.

5. Valve according to claim 2, wherein the closure member is a rotary closure member, and wherein the flowmeter is adapted to be able to transmit rotational movements between an actuator of the valve and the closure member.

6. Valve according to claim 2, wherein a first axial end of the flowmeter is mounted on the first driving control rod and a second axial end of the flowmeter is mounted on the second driven control rod for driving the closure member.

7. Valve according to claim 1, wherein at least one of the axial ends of said tubular body of the flowmeter comprises a fluid-tight passage.

8. Valve according to claim 7, wherein said flow measuring device of the flowmeter comprises at least one ultrasonic transducer extending outside said tubular body.

9. Valve according to claim 7, wherein the closure member is a rotary closure member, and wherein the flowmeter is adapted to be able to transmit rotational movements between an actuator of the valve and the closure member.

10. Valve according to claim 1, wherein said flow measuring device of the flowmeter comprises at least one ultrasonic transducer extending outside said tubular body.

11. Valve according to claim 10, wherein:
   said tubular body of the flowmeter is a straight tubular body extending along an axis passing through the two axial ends,
   each ultrasonic transducer of said flow measuring device is orthogonal to the axis of said tubular body.

12. Valve according to claim 11, wherein the flowmeter comprises a U-clamp for mounting a distal end of each transducer on said tubular body.

13. Valve according to claim 11, wherein the closure member is a rotary closure member, and wherein the flowmeter is adapted to be able to transmit rotational movements between an actuator of the valve and the closure member.

14. Valve according to claim 10, wherein the flowmeter comprises a U-clamp for mounting a distal end of each transducer on said tubular body.

15. Valve according to claim 14, wherein the closure member is a rotary closure member, and wherein the flowmeter is adapted to be able to transmit rotational movements between an actuator of the valve and the closure member.

16. Valve according to claim 10, wherein the closure member is a rotary closure member, and wherein the flowmeter is adapted to be able to transmit rotational movements between an actuator of the valve and the closure member.

17. Valve according to claim 1, wherein the closure member is a rotary closure member, and wherein the flowmeter is adapted to be able to transmit rotational movements between an actuator of the valve and the closure member.

18. Valve according to claim 1, wherein a first axial end of the flowmeter is mounted on the first driving control rod and a second axial end of the flowmeter is mounted on the second driven control rod for driving the closure member.

19. Valve according to claim 1, wherein at least the driving control rod is a tubular rod, and wherein said electrical connection of the flowmeter extends into the tubular driving control rod.

20. Valve according to claim 1, wherein the valve is a fire hydrant.

* * * * *